United States Patent [19]
Koether

[11] Patent Number: 5,726,424
[45] Date of Patent: Mar. 10, 1998

[54] MODULAR CONTROL ENCLOSURE FOR A COOKING APPLIANCE

[75] Inventor: Bernard G. Koether, Tequesta, Fla.

[73] Assignee: Technology Licensing Corporation, Tequesta, Fla.

[21] Appl. No.: 645,473

[22] Filed: May 13, 1996

[51] Int. Cl.[6] .................... F27D 19/00; F27D 21/00; F24C 15/00

[52] U.S. Cl. .................... 219/414; 219/412; 219/507; 219/702

[58] Field of Search .................... 219/412–414, 219/481, 507, 702, 715, 720, 757

[56] References Cited

U.S. PATENT DOCUMENTS

| | | | |
|---|---|---|---|
| 4,054,778 | 10/1977 | Wollich | 219/413 |
| 4,431,907 | 2/1984 | Barnett | 219/413 |
| 4,831,226 | 5/1989 | Robeson et al. | 219/702 |
| 4,956,531 | 9/1990 | Braunisch et al. | 219/757 |
| 5,025,489 | 6/1991 | Yamaguchi | 219/715 |
| 5,300,744 | 4/1994 | Maehara et al. | 219/715 |
| 5,455,403 | 10/1995 | Kim et al. | 219/702 |

FOREIGN PATENT DOCUMENTS

| | | |
|---|---|---|
| 3234042 | 3/1984 | Germany . |
| 55-000855 | 1/1980 | Japan . |

*Primary Examiner*—Teresa J. Walberg
*Assistant Examiner*—J. Pelham
*Attorney, Agent, or Firm*—J. De La Rosa

[57] ABSTRACT

The present invention utilizes a self-contained control module consisting of the electronics necessary to the control the various operations of the cooking appliance in which the module is installed, preferably including the high voltage control electronics. The control module is easily accessible and removable from the front panel without the risk of exposure to high voltage due to the presence of a safety interlock that automatically cuts the high voltage to the control module and, if desired, to other subassemblies the instant the control module is removed. In addition, the control module is housed within an electrically conductive liner to control EMI emissions. Once the control module is removed, the interior of the appliance is sufficiently sealed off by a perforated cage to prevent further access to power lines or any high voltage circuits interior to the appliance which may have not been wired through the safety interlock. Moreover, to ensure that a faulty control module is replaced properly, coded connectors, such as keyed connectors, are used between the control module and other subassemblies of the appliance, such as temperature sensors, high voltage circuits and power supplies, and low voltage circuits that may reside in the interior of the appliance.

37 Claims, 6 Drawing Sheets

MODULAR CONTROL ENCLOSURE FOR A COOKING APPLIANCE

TECHNICAL FIELD

The present invention relates to cooking appliances and, more particularly, to electrical enclosures for cooking appliances incorporating electromagnetic interference (EMI) shielding and safety features.

BACKGROUND OF THE INVENTION

Figure 1:
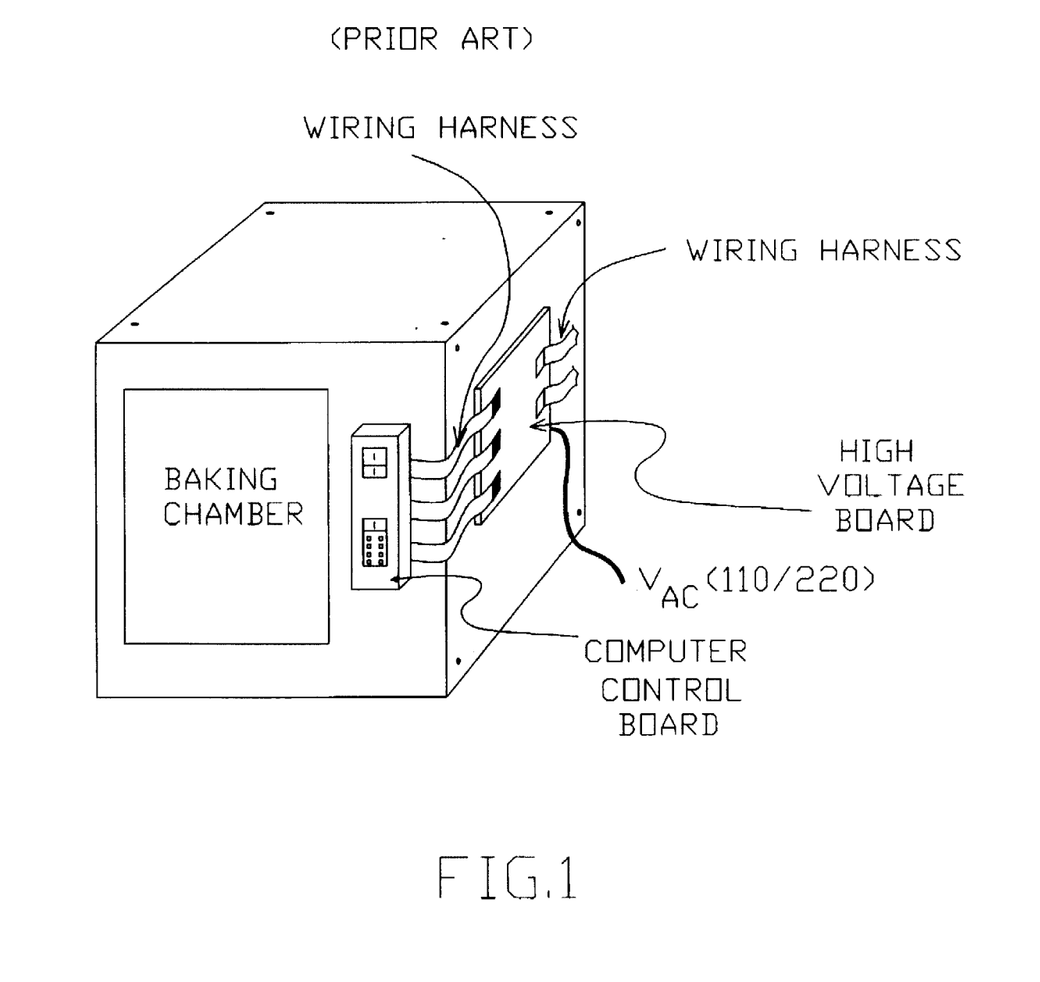
FIG. 1 is an illustration of a prior art electrical enclosure for a cooking appliance.

In the electrical design of cooking appliance enclosures or units, the conventional wisdom has been to physically partition the programmable controller, such as the computer control board, from the high voltage control board. Indeed, it is common practice in the art to physically locate the computer control board and the high voltage control board in a variety of different locations and then connect them through wiring harnesses, as illustrated in FIG. 1. The high voltage control board is commonly an assembly of input and output terminals connected to switched relays which work with the computer control board to deliver power from high voltage lines to subassemblies or elements in the cooking appliance, such as to heating elements, fans and the like.

The computer control board in a typical cooking appliance includes a keypad, a LED display, a microprocessor and a small amount of relatively low voltage electronics. They, among other things, regulate the various operations of the cooking appliance, such as the cooking time and temperature, in a conventional manner for either a single food product or a plurality of food products. In operation, the microprocessor runs software programs, accesses data from memory and responds both to user input from the keypad and temperature variations in the cooking appliance to effect proper cooking. See, for example, U.S. Pat. No. 4,920,948, which is commonly assigned and incorporated herein by reference.

In the past, partitioning the computer control board and the high voltage control board was advantageous for several reasons. The switched relays in the high voltage control board typically operate at dangerously high voltages, while the computer control board operates at lower voltages which are relatively safe. Inasmuch as the computer control board is accessible for service or maintenance by untrained operators, for safety reasons the computer control board is isolated and physically separated from the high voltage control board. Nevertheless, customers still experience high voltage shock by negligently inserting tools and contacting, for example, the high voltage power lines when the power is accidentally left on.

Also, the electromagnetic interference (EMI) generated by the high voltage control board could cause high voltage anomalies and interfere with the operation of the computer control board. As such, it has been advantageous in the past to physically separate them in separate EMI shielded enclosures.

While the two board partition approach to cooking appliance enclosures has technical advantages, it nevertheless further imposes installation and servicing difficulties as well as costs. The installation of a two board partition system is more difficult inasmuch as both the computer control board and the high voltage control board have to be installed together with the associated wiring harnesses. Moreover, as computer control boards become more complex, the corresponding increased complexity in the wiring harnesses have also made the systems less reliable.

Furthermore, servicing cooking appliances employing the two board partition approach typically requires that the front and side, and possibly the rear panels of the enclosure or unit be removed. Both boards are not accessible merely by removing the front panel given their proximity to each other. Unfortunately, many cooking appliances, such as ovens and the like, are installed in recessed areas which makes it extremely difficult to access the side and rear panels. To effect repairs, the entire cooking appliance must therefore be moved to a different location.

Of course, there are also the additional costs associated with a two board partition system, such as the real estate and, the connectors and cables between the boards that enable them to communicate with each other. All of these components add to the cost of the cooking appliance, which cost can be particularly burdensome in a small cooking appliance system meant to be sold in a price sensitive market.

Accordingly, what is needed is a simple and low cost cooking appliance enclosure or unit that reduces or eliminates the excess costs, as well as the servicing and installation problems of the prior art while retaining the beneficial EMI and safety features of the two board partition system.

SUMMARY OF THE INVENTION

The present invention utilizes a self-contained control module consisting of the electronics necessary to the control the various operations of the cooking appliance in which the module is installed, preferably including the high voltage control electronics. The control module is easily accessible and removable from the front panel without the risk of exposure to high voltage due to the presence of a safety interlock that automatically cuts the power, including the high voltage, to the control module the instant the module is begun to be removed. If desired, the safety interlock may also be wired to disable power to some or all of the subassemblies within the appliance. In addition, the control module is housed within an electrically conductive liner to control EMI emissions.

Once the control module is removed, the interior of the appliance is sufficiently sealed off, for example, by a perforated cage to prevent further access to power lines or any high voltage circuits interior to the appliance which may not have been wired through the safety interlock. Moreover, to ensure that a faulty control module is replaced properly, coded connectors, such as keyed connectors, are used between the control module and other subassemblies of the appliance, such as temperature sensors, high voltage circuits and power supplies, and low voltage circuits that may reside in the interior of the appliance. At the bottom of the front panel of the enclosure is also attached an I/O port, such as a straight plug 3-pin connector port. Alternatively, the I/O port of course may use wireless communication, such as infrared or RF communication. On site repairs may be effected through the use of a portable hand held terminal linked to the control module through the I/O port. In operation, the hand held terminal may interrogate the control module so as to diagnose abnormal operating conditions of the cooking appliance.

BRIEF DESCRIPTION OF THE DRAWINGS

The features and advantages of the present invention will become more readily apparent from the following detailed description of the invention in which like elements are labeled similarly and in which.

DETAILED DESCRIPTION

The inventive cooking appliance assembly in accordance with the principles of the invention utilizes a self-contained control module consisting of the electronics necessary to the control the various operations of the cooking appliance in which the module is installed, preferably also including the high voltage control electronics. Importantly, the control module is easily accessible and removable from the front panel without the use of special tools and without the risk of exposure to high voltage. As equally important, a safety interlock automatically cuts the power, including the high voltage, to the control module the instant the control module is begun to be removed from its enclosure. If desired, the power to some or all of the subassemblies interior to the appliance may also be wired through the safety interlock. The depth of the control module is judiciously selected to prevent access to its interior before the safety interlock has had time to disable the power. This unique feature, among other things, affords a highly efficient means for allowing an untrained operator to timely service most faulty appliances—without the need of a repair technician—by simply replacing the control module.

Once the control module is removed, the interior of the appliance is sufficiently sealed off, for example, by a perforated cage to prevent further access to power lines or any high voltage circuits interior to the appliance, which may not have been wired through the safety interlock and thus may still be energized. Moreover, to ensure that the faulty control module is replaced properly, coded connectors are used between the control module and other subassemblies, such as temperature sensors, high voltage circuits and power supplies, and low voltage circuits that may reside in the interior of the appliance.

It is contemplated that the size of the control module be standardized so as to fit within appliances manufactured by different companies. Such standardization will reduce manufacturing costs, and correspondingly lower the cost to the end user.

Without any loss of generality or applicability for the principles of the present invention, in the embodiment herein below the description is directed to a baking oven. It should be clearly understood, however, that the term cooking appliance shall be understood to include deep fryers, refractory ovens, baking ovens, combination ovens, infrared ovens, rotisseries and the like.

Figure 2:
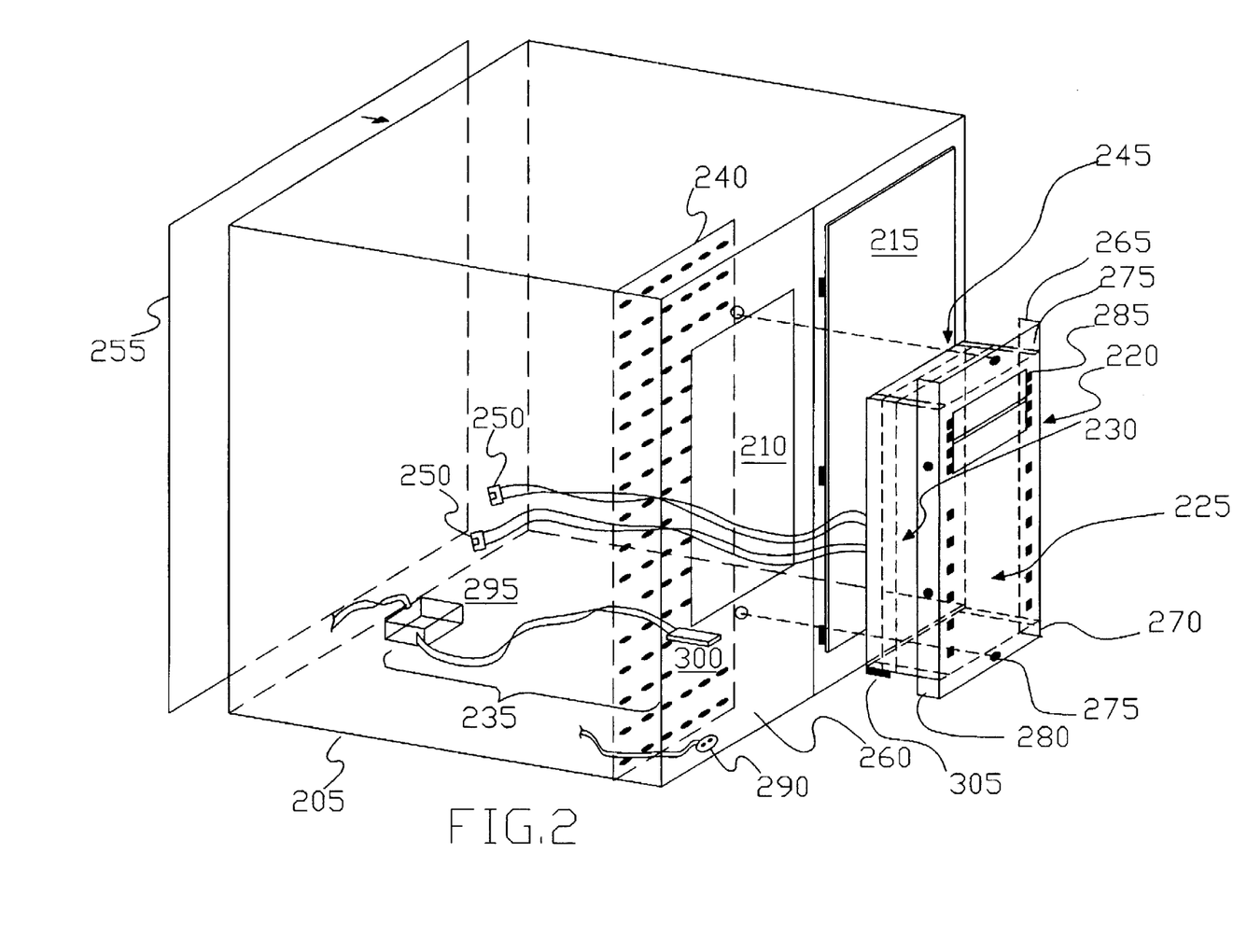
FIG. 2 is an exploded view of a cooking appliance including a modular control enclosure in accordance with the principles of the invention.

FIG. 2 shows an exploded view of a modular partition cooking appliance assembly which embodies the principles of the invention. The system consists of an enclosure 205 having a recess cavity 210 and housing a cooking chamber 215 which in this embodiment is a conventional baking oven chamber; a control module 220 having a computer control board 225 and a high voltage control board 230 stacked together in a single module; a safety interlock 235; and an electrically conductive perforated cage 240. A plug connection (not shown) between computer control board 225 and high voltage control board 230 enables them to communicate with each other. Control module 220 also has an attached electrically conductive liner 245 and keyed connectors 250 for connecting to control circuitry housed beyond perforated cage 240 and interior to recess cavity 210.

The assembly of FIG. 2 is shown having recess cavity 210 to receive control module 220 and a back opening to receive rear cover 255. Perforated cage 240 is preferably perforated with openings of sufficient size to effect ventilation, with control module 220 enclosed in electrically conductive liner 245 to achieve EMI shielding. Once control module 220 is removed, the interior of the appliance is sufficiently sealed off by perforated cage 240 to prevent access to power lines or any interior high voltage circuits which may not have been wired through safety interlock 235 and thus may still be energized. Those skilled in the art will readily note that perforated cage 240 may also be made as a solid cage. Although not show in FIG. 2, the bottom wall or the rear wall of the unit has similar perforations for the same reason. In this manner, air is allowed to flow through the recessed region to provide cooling for circuit components on computer control board 225 and high voltage control board 230. Of course, the perforations are designed to provide adequate airflow while effecting EMI shielding. Also, if desired, the side walls may be made from a non-metallic material, with the interior surfaces of the side walls painted with electrically conductive paint to effect EMI shielding.

In FIG. 2, control module 220 is mounted on a face panel 260 of the cooking appliance. In an assembled unit, a plug connector which protrudes from computer control board 225 mates with corresponding pins on high voltage board 230. Captive screws (not shown) located near the top and bottom edges of control module 220 securely attach computer control board 225 and high voltage control board 230 as a single module. The region between the front face of control module 220 and perforated cage 240 is a mixed low and high-voltage region in which some high voltages lines from power supplies or transformers terminate on input terminals of high voltage control board 230. Electrically conductive liner 245 covers the entire control module 220. The side edges of electrically conductive liner 245 may be held to front panel 260, for example, by tabs located along the back side of front panel 260 when secured to the unit.

Edge portions 265 and 270 extend from the top and bottom walls, respectively, of electrical conductive liner 245 to underside portions of front panel 260 where they are secured by captive screws 275. Preferably, captive screws 275 may be released without the use of special tools or hand released. Moreover, shoulder portions 280 and 285 extend rearward from the side walls of electrically conductive liner 245. Shoulder portions 280 and 285 provide laterally extending surfaces that cooperate with electrically conductive liner 245 to effect EMI shielding when control module 215 is placed in recessed cavity 210. Metal snap receptacles on each side of front panel 260 may be used to hold control module 220 in place.

At the bottom of front panel 260 is attached an I/O connector 290. On site repairs may be effected through the use of a portable hand held terminal linked to computer control board 225 through I/O connector 290. For hostile environments, coaxial and multipole plugs connectors may be used, such as a straight plug 3-pin connector. Alternatively, wireless communication, such as through infrared or RF communication, may also be used to link the hand held terminal and computer control board 225. Preferably, the hand held terminal includes a Pahn/Laptop computer, such as those readily available from Texas Instruments, Hewlett Packard and Casio, among others. In operation, the hand held terminal may interrogate computer control board 225 so as to diagnose abnormal operating conditions. See U.S. Pat. No. 5,043,860, U.S. Ser. Nos. 08/501,211 and 08/549,098 which are commonly assigned and incorporated herein by reference. The low level diagnostic software may be stored in, for example, standardized memory cards conforming to both the JEDIA and PCMIA standards.

Figure 3:
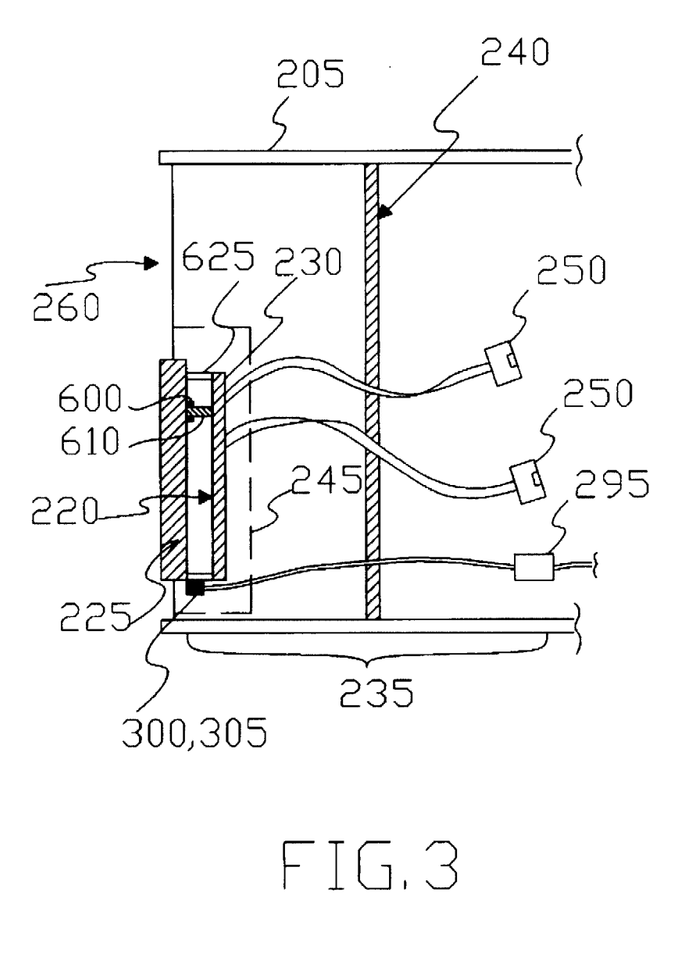
FIG. 3 is a partial side view of the cooking appliance of FIG. 2 without its side cover installed.

FIG. 3 is a side view of the enclosure of FIG. 2. Perforated cage 240 is a recessed wall member of preferably perforated sheet metal and with front panel 260 bounds a recessed region in which is mounted control module 220. The operating voltages in the recessed region includes a mixed low and high voltage region, but is a relatively safe region for service inasmuch as a key feature of the electrical enclosure is safety interlock 235 which automatically disables the power, including the high voltage, to control module 215 the instance the module is begun to be removed. Other power lines to subassemblies interior to the appliance may also be wired through safety interlock 235 so as to effectively make the appliance inoperative. Preferably, safety interlock 235 includes a relay 295 for removing the high voltage lines to high voltage control board 230; a magnetic reed switch 300 securely fixed within the enclosure for sensing the instance control module 220 is removed; and a magnet 305 correspondingly positioned on control module 220 and aligned with reed switch 300 when control module 220 is secured in place.

Figure 4:
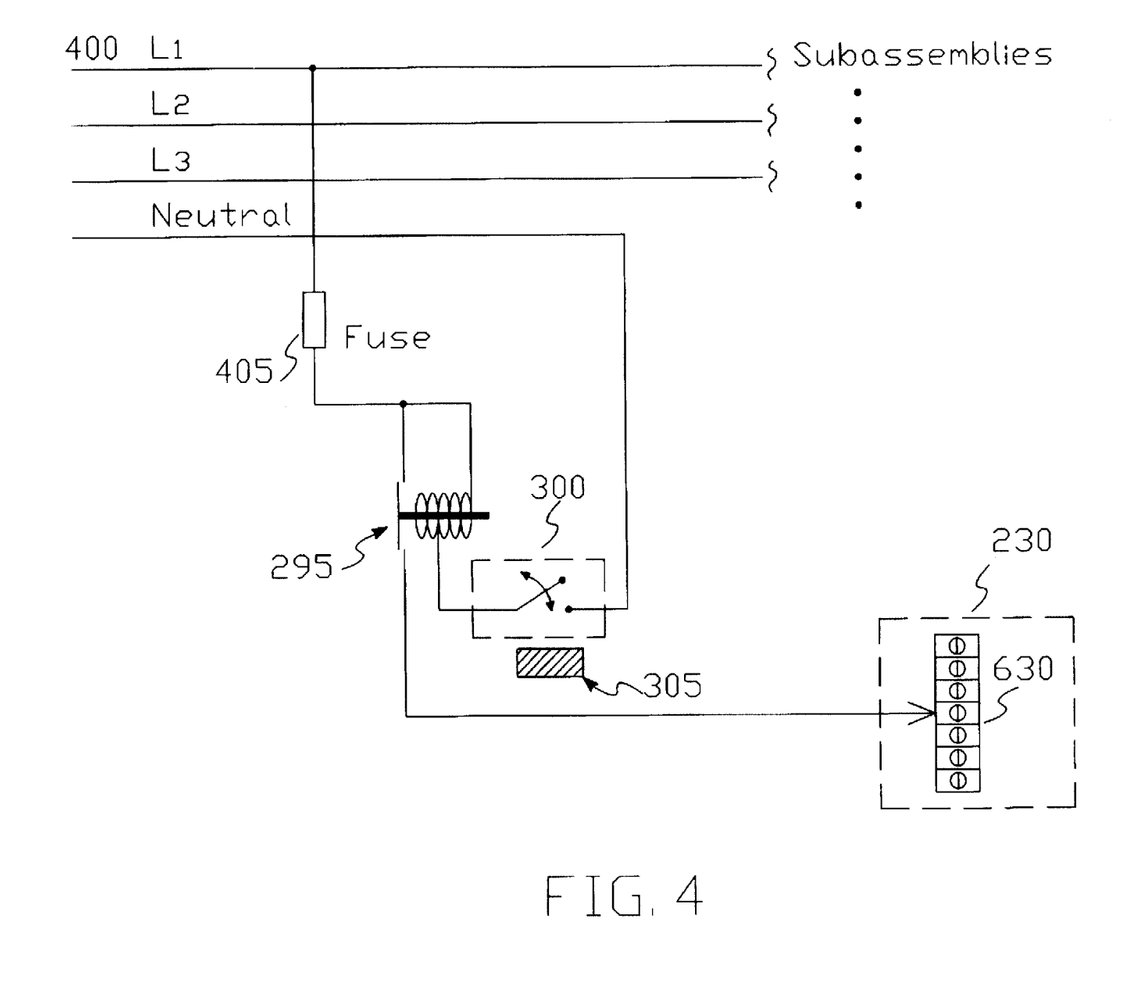
FIG. 4 is a schematic wiring diagram of the safety interlock system of FIG. 2 in accordance with the principles of the invention.

Referring to FIG. 4, there is shown a schematic diagram of the safety interlock system. High voltage line 400 (L1) feeds through fuse 405 and relay 295 to terminal high voltage inputs 630 located on high voltage control board 230. Although safety interlock 235 is based on a Hall-effect reed relay switch, those skilled in the art will readily note, however, that other types of safety interlocks may be used, such as optical or capacitive interlocks. Removal of control module 220 causes magnetic reed switch 300 to open which in turn causes relay 295 to open and thereby removes high voltage line 400 (L1) from the terminal high voltage input of high voltage control board 230. It should be clearly understood that the other power lines (L2 and L3) to subassemblies within the appliance may also be wired through safety interlock 235. Importantly, safety interlock 235 is designed to disable power when screws 275 fastening control module 220 to front panel 260 are loosened. Preferably, power is disabled upon a displacement of control module 220 less than a quarter of inch from front panel 260. In this manner, this region of mixed low and high voltage is relatively safe for service. Those skilled in the art will readily appreciate that this unique feature, among other things, affords a highly efficient means for allowing an untrained operator to timely service most faulty appliances—without the need of a repair technician—by simply and safely replacing control module 220.

Figure 5:
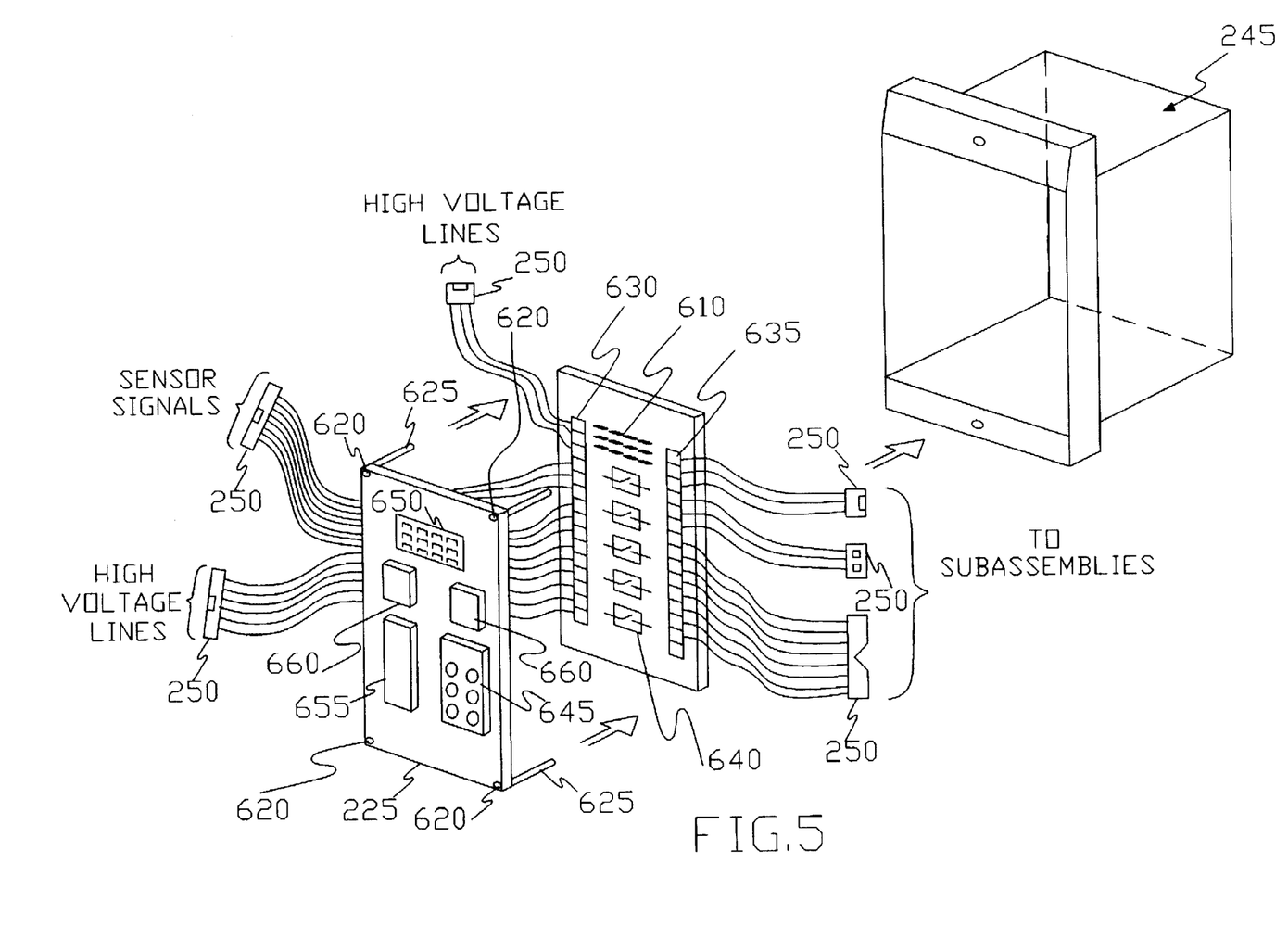
FIG. 5 is an exploded view of the modular control enclosure of FIG. 2.
Figure 6:
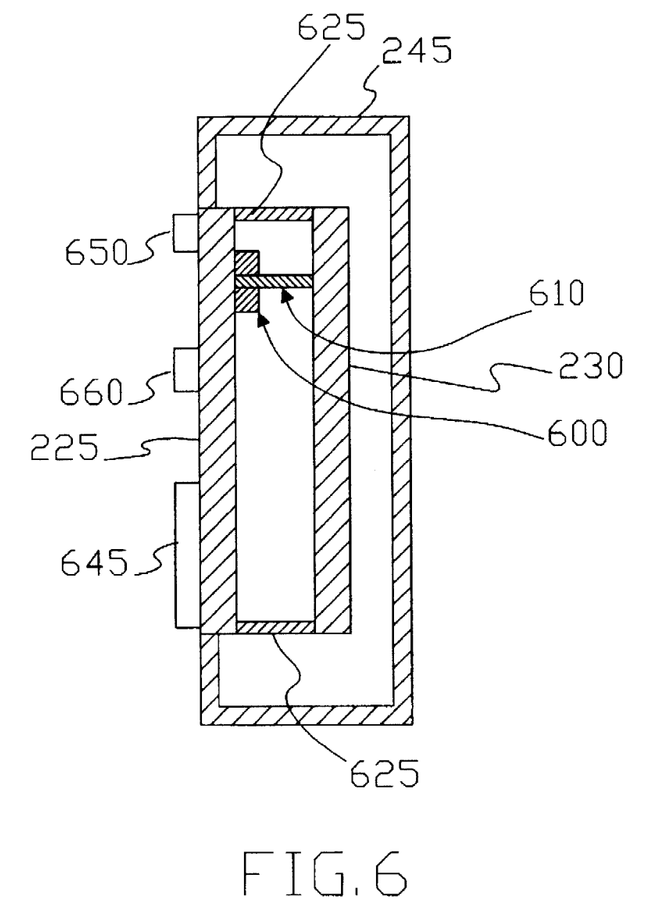
FIG. 6 is a side view of the modular control enclosure of FIG. 5 when assembled.

FIGS. 5 and 6 show the interconnection between computer control board 225 and high voltage control board 230 which is the means by which relay control signals are communicated to high voltage control board 230. Plug connector 600 protrudes from the back side of computer control board 225 and mates with corresponding pins 610 on high voltage control board 230. High voltage control board 230 is stacked laterally to computer control board 225 by screws 620 which engage standoffs 625 therebetween. Computer control board 225 contains components that implement the cooking control functions of the appliance. On computer control board 225, there are several integrated circuits, with I/O connector 290 connecting computer control board 225 to external devices, such as a hand held terminal.

As illustrated, high voltage control board 230 preferably is an assembly of input and output terminals, 630 and 635, respectively, connected to switched relays 640 which work with computer control board 225 to deliver power from high voltage line 400 to subassemblies or elements of the appliance, such as to the heating means, fans, dampers, humidifiers, and the like. In the former case, the heating means may consist of resistive element(s) or other suitable type of electric heater well known in the art. Those skilled in the art will readily understand that high voltage lines may be connected to transformers at the primary windings, with the stepped down or stepped up voltage appearing at the secondary windings and connected, for example, to input terminals 630 of high voltage control board 230.

Computer control board 225 includes, but is not limited to, a keypad 645, a LED display 650, a microprocessor 655 and relatively low voltage electronics 660. Computer control board 225, among other things, regulates the various operations of the cooking appliance, such as the cooking time and temperature, in a conventional manner for either a single food product or a plurality of food products.

It should, however, be clearly understood that control module 225 may include other electronics residing on a separate board and stacked in a similarly modular fashion. For example, signal conditioning electronics may be placed on a third board to reshape control signals from computer control board 225 to high voltage control board 230. Likewise, miniaturized power supplies, memory modules and the like may be placed on additional boards. To effect EMI shielding, those skilled in the art will readily recognize that conductive traces carrying necessary control or computer signals should be partitioned from and positioned sufficiently away from lines or traces associated with high voltage signals. If desired, a metallic shield may be positioned within the control module between computer control board 225 and high voltage control board 230 to function as an EMI barrier between them so that mutual interference is minimized.

In alternative embodiments, it may be convenient for the control module to constitute the entire portion of the front panel, rather than residing in a portion thereof. In such a configuration, the top, bottom and side edges mate, respectively, with the top, bottom and side walls of the enclosure when secured in place.

There are particular advantages which arise from the modular assembly approach and the safety interlock features described above in accordance with the principles of the present invention. By way of reiteration, since power—including the high voltage lines—are automatically disconnected from the control module, service personnel as well as untrained customers may readily effect service due to the absence of potentially hazardous high voltages. Also, in the past, servicing cooking appliances employing a two board partition approach typically required that the front and side, and possibly the rear panels of the enclosure or unit be removed. Advantageously, the use of a self-contained control module consisting of the electronics necessary to the control the various operations of the cooking appliance, preferably including the high voltage control electronics, makes the module easily accessible, only requiring the removable of the front panel.

It should be fully appreciated that the control module of the present invention may be safely removed without the use of special tools and without the risk of exposure to high voltage because the safety interlock automatically cuts the high voltage to at least the control module the instant the module is begun to be removed. Also, the modular assembly is advantageously connected to the internal subassemblies of the oven with unique keyed mating connectors, preferably also color coded, to ensure that any faulty module is replaced properly. For example, unique keyed connectors may be used between the control module and other subassemblies, such as the temperature sensors, high voltage circuits and power supplies, and low voltage circuits that may reside in the interior of the appliance. Accordingly, because each keyed connector can only be connected to an appropriate mate connector, control module 220 cannot be installed improperly. Color coding the connectors further assists an untrained operator to connect a new control module with the appropriate subassembly connectors. This prevents any injuries or damages that can arise due to improperly connected lines.

Yet still another advantage of the present inventions is that an appliance may be readily reprogrammed without the need of having a service personnel on site. A properly configured control module including the programming features desired by the customer can be simply shipped to the customer who can now safely install the control module without the hazards of the high voltage.

Compared with the prior art philosophy of portioning the computer control board and high voltage control boards, the present system minimizes cost due to the corresponding decrease in the number of connectors used as well as affords a customer the capability of readily accessing components most likely to fail during normal operations.

It should be understood that the embodiment herein is merely illustrative of the principles of the invention. Various modifications may be made by those skilled in the art which will embody the principles of the invention and fall within the spirit and the scope thereof.

I claim:

1. A modular control enclosure assembly for a cooking appliance comprising:
   an enclosure having a front panel with a recessed cavity therebehind;
   a control module housing electronics necessary for controlling the operations of the cooking appliance, said control module positioned in said recessed cavity and having input and output lines;
   means for sensing the removal of said control module from said recessed cavity; and
   safety interlock means responsive to said means for sensing for disabling power to said control module when said control module is removed from said recessed cavity.

2. The modular control enclosure of claim 1 wherein said electronics includes high voltage control electronics capable of switching power from high-voltage lines to subassemblies of said cooking appliance.

3. The modular control enclosure of claim 2 wherein said subassemblies include temperature sensors, fans, electronic circuits, and power supplies.

4. The modular control enclosure of claim 2 wherein said safety interlock means further includes means for disabling power to said subassemblies of the cooking appliance.

5. The modular control enclosure of claim 1 wherein said control module is mounted within said recessed cavity such that said control module is readily accessible and removable solely from the front panel of the cooking appliance.

6. The modular control enclosure of claim 1 further comprising a cage located directly behind said control module, said cage preventing access therethrough to the interior of the cooking appliance.

7. The modular control enclosure of claim 6 wherein said cage is perforated.

8. The modular control enclosure of claim 1 further comprising a plurality of coded connectors interconnecting each of said input and output lines from said control module uniquely to electrical lines of subassemblies located within said cooking appliance.

9. The modular control enclosure of claim 8 wherein said coded connectors are keyed connectors.

10. The modular control enclosure of claim 8 wherein said coded connectors are color coded.

11. The modular control enclosure of claim 1 further comprising an electrically conductive liner enclosing said control module so as to provide EMI shielding.

12. The modular control enclosure of claim 1 further comprising an I/O means connected to said control module for communicating to an external device.

13. The modular control enclosure of claim 12 wherein said I/O means includes means for communicating wirelessly to an external device.

14. A modular cooking appliance assembly comprising:
   an enclosure housing a cooking chamber;
   a control module attached to said enclosure and having a computer control means for regulating the various operations of a cooking appliance, and
   high voltage control means responsive to said computer control means for switching power to subassemblies of the cooking appliance, said computer control and high voltage control means stacked in a modular manner;
   means for sensing the removal of said control module from said enclosure; and
   safety interlock means responsive to said means for sensing for cutting the power to said high voltage control means when said control module is removed from said enclosure.

15. The modular cooking appliance of claim 14 wherein said safety interlock means includes means for cutting power to subassemblies of the cooking appliance when said control module is removed from said enclosure.

16. The modular cooking appliance of claim 14 further comprising means located behind said control module, for preventing access therethrough to the interior of the cooking appliance.

17. The modular cooking appliance of claim 14 wherein said subassemblies include temperature sensors, fans, electronic circuits, and power supplies.

18. The modular cooking appliance of claim 14 further comprising a plurality of connectors interconnecting said input and output lines from said control module uniquely to electrical lines of said subassemblies.

19. The modular cooking appliance of claim 14 wherein said plurality of connectors include keyed connectors.

20. The modular cooking appliance of claim 18 wherein said plurality of connectors include color coded connectors.

21. The modular cooking appliance of claim 14 further comprising an electrically conductive liner enclosing said control module so as to provide EMI shielding.

22. The modular cooking appliance of claim 14 further comprising means for communicating to an external device.

23. The modular cooking appliance of claim 22 wherein said means for communicating includes a connector connected to said control module.

24. The modular cooking appliance of claim 22 wherein said means for communicating includes means for communicating wirelessly to the external device.

25. The modular cooking appliance of claim 14 wherein said safety interlock means includes a Hall-effect relay switch.

26. The modular cooking appliance of claim 14 further comprising a connector protruding from said computer control means and mating with pins on said high voltage control means so as to enable communication therebetween.

27. A housing for a cooking appliance, comprising:

an enclosure having a recessed cavity and housing a cooking chamber;

a control module mounted in said recessed cavity, said control module including electronics necessary for controlling the operations of the cooking appliance;

means mounted in said recessed cavity and made of electrically conductive material for enclosing said control module so as to shield EMI therefrom;

a relay having open and closed states, wherein said relay in the closed state couples power to said control module of the cooking appliance, and in the open state disconnects power to said control module; and switch means for sensing the removal of said control module from said recessed cavity, said switch means placing said relay in its closed state when said control module is positioned within said recessed cavity, and said switch means placing said relay in its open state when said control module is removed from said recessed cavity.

28. The housing for a cooking appliance of claim 27 wherein said control module includes means for switching power to subassemblies of the cooking appliance.

29. The housing for a cooking appliance of claim 28 wherein said relay in the closed state couples power to subassemblies of the cooking appliance, and in the open state disconnects power to the subassemblies.

30. The housing for a cooking appliance of claim 28 wherein said electronics and said means for switching are mounted on stacked printed circuit boards.

31. The housing for a cooking appliance of claim 27 further comprising a perforated cage located behind said control module, said perforated cage preventing access therethrough to the interior of the cooking appliance.

32. The housing for a cooking appliance of claim 27 further comprising a plurality of connectors interconnecting input and output lines from said control module uniquely to electrical lines of said subassemblies.

33. The housing for a cooking appliance of claim 32 wherein said plurality of connectors include keyed connectors.

34. The housing for a cooking appliance of claim 32 wherein said plurality of connectors include color coded connectors.

35. The housing for a cooking appliance of claim 27 further comprising an I/O port coupled to said control module for communicating to an external device.

36. The housing for a cooking appliance of claim 35 wherein said I/O port includes means for wireless communication.

37. The housing for a cooking appliance of claim 27 wherein said switch means includes a Hall-effect relay switch.

* * * * *